Figure 1:
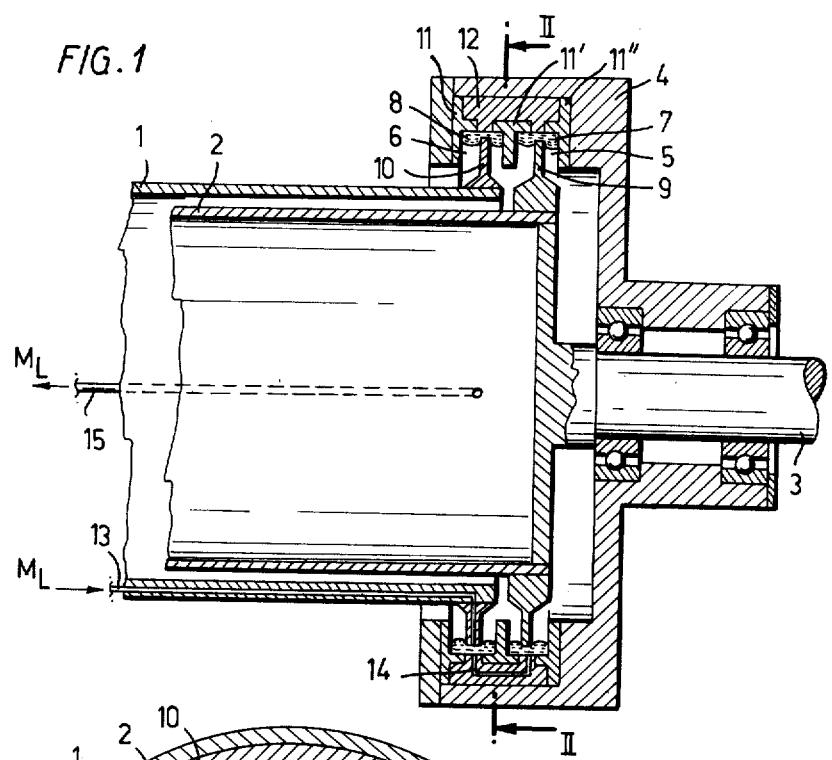

United States Patent [19]

Eriksson

[11] 4,171,496
[45] Oct. 16, 1979

[54] APPARATUS FOR TRANSFERRING ELECTRICAL CURRENT BETWEEN TWO ELECTRICAL CONDUCTORS WHICH CAN BE BROUGHT INTO A MOVEMENT OF ROTATION IN RELATION TO EACH OTHER AROUND A COMMON AXIS

[76] Inventor: Jarl-Thure Eriksson, Jätterösvägen 3 B 19, 00340 Helsinki 34, Finland

[21] Appl. No.: 779,660

[22] Filed: Mar. 21, 1977

[30] Foreign Application Priority Data

Mar. 25, 1976 [FI] Finland .............................. 760817

[51] Int. Cl.² .................................. H02K 13/00
[52] U.S. Cl. ........................... 310/219; 310/67 R; 310/114; 310/232
[58] Field of Search ............... 310/219, 178, 114, 232, 310/119, 67, 115–117, 127, 128, 143, 148; 339/1 R, 2 R, 5 L, 5 M; 318/361, 541, 542; 322/54, 48

[56] References Cited

U.S. PATENT DOCUMENTS

| | | | |
|---|---|---|---|
| 3,444,408 | 5/1969 | Krulls | 310/178 |
| 3,579,006 | 5/1971 | Kindl | 310/232 |
| 3,604,967 | 9/1971 | Krulls | 310/178 |
| 3,831,049 | 8/1974 | Korotenko | 310/178 |
| 3,846,653 | 11/1974 | Korotenko | 310/178 |
| 4,034,248 | 7/1977 | Mole | 310/219 |
| 4,041,377 | 8/1977 | Mole | 310/178 |

*Primary Examiner*—R. Skudy
*Attorney, Agent, or Firm*—Ladas, Parry, Von Gehr, Goldsmith & Deschamps

[57] ABSTRACT

An apparatus for transferring electrical current between two electrical conductors which can be rotated relatively to each other via an auxiliary coaxial rotor arranged radially outside both conductors and provided with two grooves containing liquid metal the conductors having annular contact flanges being submerged into the two rings of liquid metal, respectively.

8 Claims, 6 Drawing Figures

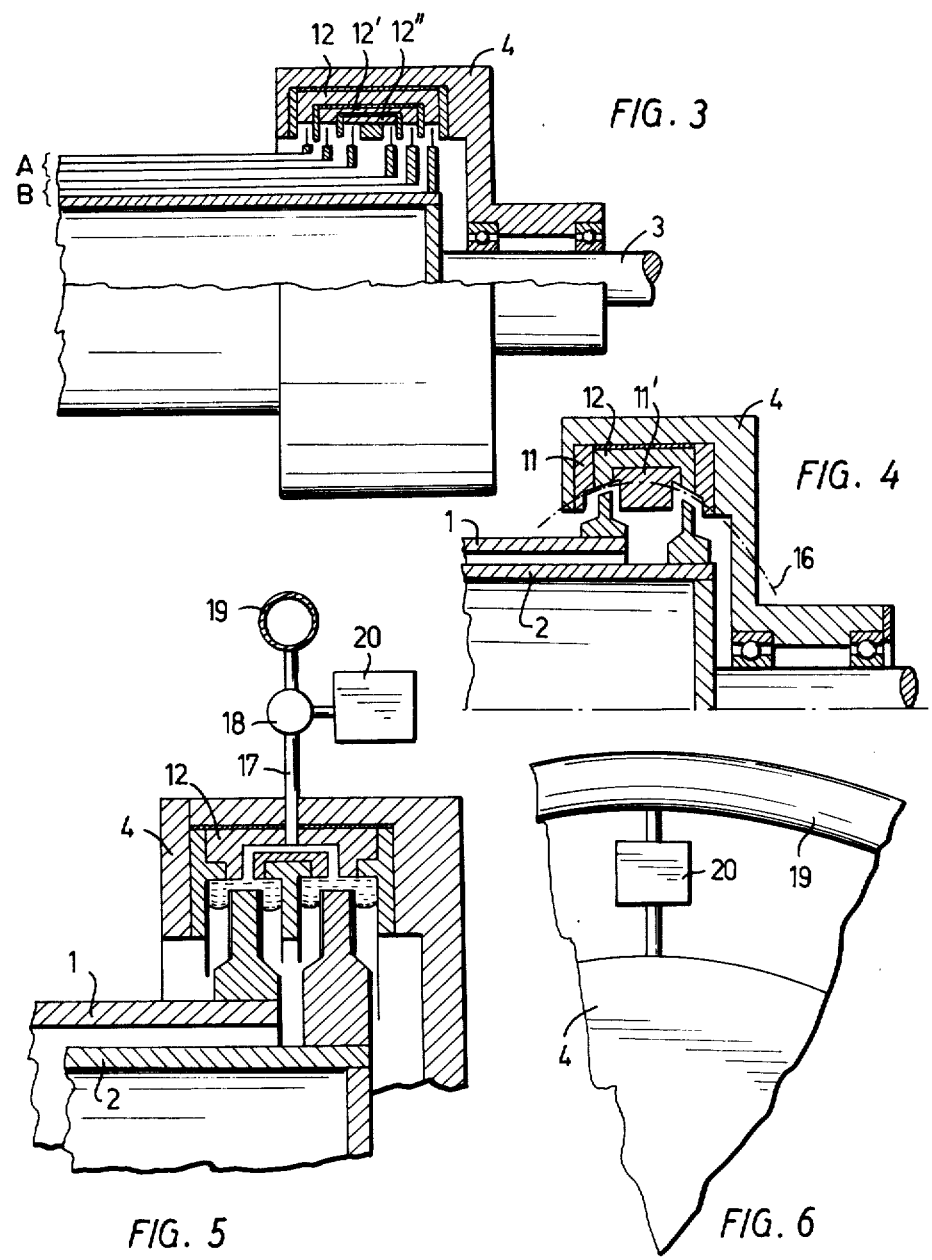

APPARATUS FOR TRANSFERRING ELECTRICAL CURRENT BETWEEN TWO ELECTRICAL CONDUCTORS WHICH CAN BE BROUGHT INTO A MOVEMENT OF ROTATION IN RELATION TO EACH OTHER AROUND A COMMON AXIS

The present invention is concerned with an apparatus for transferring electrical current between two electrical conductors which can be brought into a movement of rotation in relation to each other around a common axis, e.g. the stator and the rotor in electrical machines, which apparatus comprises two grooves open towards the axis of rotation, a ring of liquid metal in each of the grooves, and an auxiliary rotor which is arranged as rotating around an axis coaxial with the axis of rotation of the electrical conductors and which is in contact with the two rings of liquid metal, whereby the rings are brought into a movement of rotation which, by the effect of the centrifugal force, maintains them in the grooves, the electrical current being transferred from one conductor to the other one over the two rings of liquid metal and the conductive units in the auxiliary rotor.

In electrical machines it is usual that the electrical current is transferred from a rotary component to a stationary component over solid brushes. However, there is a need to improve the transfer properties of the solid brushes; by increasing the current density at the contact point, on one hand, and by reducing the mechanical phenomena of friction and wear depending on the difference in speed between the contact surfaces, on the other hand. It is well known that the use of a metal in liquid form (hereinafter: liquid metal) permits considerably higher current densities than solid brushes do, and, moreover, the electrical and mechanical losses at the transfer point are little. Liquid-metal collector means additionally permit high differences in speed between the contact surfaces.

The difficulty of application of liquid metal between the contact surfaces has so far limited the application on a larger scale. If the apparatus in which the current collecting takes place has a vertical axis of rotation and the plane of the contact surfaces is horizontal, there are no problems, because the liquid metal is kept by the gravitation in a circular groove. Many apparatuses, among them also most electrical machines, however, require that the axis of the rotary component is horizontal, which results in the fact that the current transfer points consist of circular contact surfaces in the vertical plane. If it is required that the liquid metal shall constitute a whole ring between the contact surfaces, said liquid metal must be applied by means of centrifugal force. (A closed space filled with liquid metal would require radial gaskets with a very good sealing capacity.) The movement necessary for the centrifugal force is transferred to the liquid metal by means of friction against a rotary face, either against the rotary contact surface or against an auxiliary rotor placed in the liquid metal channel (U.S. Pat. No. 3,604,967). The average speed of the liquid metal body is in proportion to the area of the friction face. In most apparatuses with current collecting the geometry is such that the stationary part is outside the rotary one. Likewise, it appears to be natural that possible grooves for liquid metal are placed in the stationary part, whereas the movement-producing component (auxiliary rotor or rotor flange) is placed on the inside of the groove. As a result of this, the braking surface (groove) becomes larger than the movementproducing surface, for which reason the average speed of the liquid metal body becomes less than half the speed of the mobile surface. In order that the centrifugal force should be higher than the gravitation force at the topmost point of the groove, the peripheral speed of the rotary part must exceed a relatively high marginal value. In apparatuses with low rotating speeds or in apparatuses in which the lowest occurring speed of rotation available by means of speed adjustement is lower than the stability limit of the centrifugal force, liquid-metall collecting cannot be used in the way described above if the movementproducing part is coupled straight to the rotor. If a separately driven auxiliary rotor is used, said auxiliary rotor must have a very high speed, out of reasons mentioned above.

The apparatus in accordance with the present invention makes it possible, by transmission by means of two liquid-metal contact points, to transfer a current between two electrical conductors, which at different time intervals of operation of the apparatus can be both stationary, one of them stationary and the other one rotating, or both of them rotating. The apparatus provides the necessary prerequisites in order that the liquid metal should form two whole stable rings between the contact surfaces even at relatively low speeds of the auxiliary rotor. Moreover, the apparatus can be easily designed as a multiple contact device, i.e. it can transfer current between electrical circuits which are, in the present apparatus, galvanically isolated from each other.

These advantages are obtained by means of the apparatus in accordance with the present invention, which is mainly characterized in that the auxiliary rotor is arranged radially outside the two conductors, that the two grooves are placed on the inside periphery of the auxiliary rotor, and that the two conductors are provided with in themselves known annular contact flanges which extend radially outwards into the grooves concerned so that the contact flanges come into contact with the rings of liquid metal.

Figure 2:
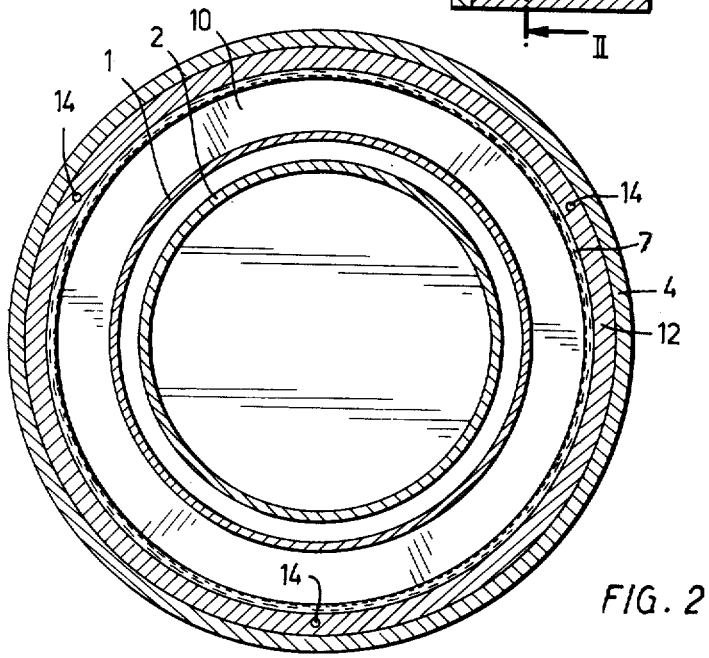

The invention will be described more closely below with reference to the attached drawing, wherein FIG. 1 shows, as a longitudinal section, one end of an electrical machine provided with the apparatus in accordance with the present invention, FIG. 2 shows a cross-section along the line II—II in FIG. 1, FIG. 3 shows one end of an electrical machine with several contact transfers, partly in longitudinal section, FIG. 4 is a partial view of another embodiment of the apparatus in accordance with the invention, FIG. 5 schematically shows an apparatus for emptying the grooves as a longitudinal section, and FIG. 6 shows the same apparatus as FIG. 5 as an end view.

The principle of the apparatus comes out from FIG. 1. The electrical machine consists of two electrical conductors 1 and 2, of which conductor 1 normally constitutes the stator and the conductor 2 the rotor and which can be cylindrical or disk-shaped plates or discretely distributed metal rods. Both conductors or one of the conductors can be made to rotate around a common axis. FIG. 1 shows conductor 2 having an axle 3 coaxial with the common axis for rotatably driving conductor 2 around the common axis. An auxiliary rotor 4 is mounted on this axle, rotatably supported by bearing means in a manner permitting it to be separately driven. According to the invention, the auxiliary rotor is arranged, as viewed radially, outside the conductors 1,2, and its inside periphery is provided with two grooves 5 and 6 whose bottom, when in operation, is covered by a ring of liquid metal 7 and 8. The conductors 1 and 2 are provided with annular contact flanges 9 and 10, which extend radially outwards into the respective grooves so that their peripheries come into contact with the liquid metal rings. The vertical sides of the flanges are provided with an electrically insulating plating if magnetic fields that cause eddy currents pass through the apparatus. The walls of the grooves 5,6 and part of their bottoms are preferably of an insulating material 11,11', 11'' in order to restrict the passage of the current through the liquid metal to a channel between the flange and a desired area in the groove bottom. The galvanic contact between the liquid metal rings in the auxiliary rotor is produced by means of an electrically conductive unit in the form of a metallic contact piece 12, which consists of two annular components (groove bottoms) as connected together with a cylindrical conductor or discretely distributed rods. If the body of the auxiliary rotor is electrically conductive, the insulation is placed between the contact piece 12 and the body, whereby the collecting circuit is insulated from possible earth.

The liquid metal can be passed into the groove in several ways:

1. Via rotary connections on the axle of the auxiliary rotor.
2. Via channels in each of the contact flanges.
3. Via a channel in one of the flanges and a connecting channel between the grooves on the side of the auxiliary rotor.

As an example, alternative 3 is shown in FIGS. 1 and 2, in which $M_L$ represents the liquid metal. The supply channel 13 may consist either of a hole in the conductor or of a tube outside the conductor. Between the grooves, there is a connecting channel 14. In FIG. 2, by way of example, three such channels have been illustrated. The liquid metal is passed out through a channel 15.

When liquid metal is used for collecting purposes, it is contaminated and must be purified. The liquid metal system is therefore usually made circulating. In FIGS. 1 and 2, the feeding-in is thought of as taking place to the lowest position of the groove in the auxiliary rotor, whereas the removal takes place, as viewed in the direction of movement of the liquid-metal body, 90° earlier.

FIG. 3 shows an arrangement with several contact transfers, which is the case in most machines. The electrical connection conductors are divided into two groups A and B. The contact pieces 12,12',12'' of the auxiliary rotor can be either concentric cylinder mantles or discretely distributed rods. In the latter case, all the rods can be placed on the same cylinder surface. Moreover, the order of connecting between the grooves may be varied.

If an external magnetic field passes through the apparatus, the effect of a unipolar direct current between galvanically connected liquid-metal grooves is eliminated by placing both the grooves in the same zero-flux plane (plane through which the sum magnetic flux is zero). In FIG. 4, numeral 16 indicates such a zero-flux plane.

An external magnetic flux produces eddy currents in the liquid metal. Electrical and hydrodynamic losses resulting from this phenomenon are minimized by giving the contact faces of the current path with the liquid metal the same direction as the zero-flux plane (FIG. 4). In other words, those surfaces of the auxiliary rotor and of the contact flanges which are galvanically connected to each other, such as the contact surfaces of the outermost grooves and of the corresponding outermost flanges galvanically connected to each other via the metallic contact piece 12 in FIG. 3, are positioned in the same zero-flux plane.

When the liquid metal shall be emptied from the grooves out of some reason, the circulation system of FIGS. 1 and 2 is capable of removing the metal down to the level of the flange surface (applicable to the supply alternatives 2 and 3). For the remaining liquid-metal portion, a different system is required. FIG. 5 suggests a solution. The connecting channel between the grooves passes via a pipe 17 and a valve 18 connected to a collecting vessel 19. The valve is opened and closed by a regulator means 20, whose functioning can be controlled manually or by means of the centrifugal force. By means of a current transfer apparatus in accordance with the principle described above, it is possible to carry a current between two electrical conductors with little electrical and mechanical losses. The current density at the transfer points is typically 5 MA/m$^2$, as compared with 0.1 MA/m$^2$ in the case of conventional solid brushes. The force that is used for the application of the liquid metal rings that function as the contact medium is independent from any movement of any one of the contact flanges. The liquid metal rings are given a good stability by selecting the speed of rotation of the auxiliary rotor as sufficiently high. The stability is moreover improved by the fact that the movement is transferred to the liquid metal by means of the friction against the surface of the groove bottom, which is larger than the area of the flange. The disadvantage of a double transfer is partly balanced by the fact that the submerged portion of the flange can be made thin, whereby the hydrodynamic losses become little. If one of the flanges rotates with a nominal speed of rotation, the speed of rotation of the auxiliary rotor can be selected as equal, and thereby it is possible to eliminate hydrodynamic losses at the transfer concerned at said nominal speed of rotation.

The periphery of the flange can also be provided with regular bulgings, in which case only these bulgings are in contact with the liquid metal.

The collector-device is, for example, applicable in homopolar machines, slip-ring machines, and synchronous machines, especially if these latter machines have a rotating armature winding.

The present invention can be put into effect by means of various modifications, but it is not restricted to the solutions of detail that have been used here in order to describe the principle, but the invention comprises all embodiments that are included in the scope of the following patent claims.

What I claim is:

1. In an apparatus for transferring electrical current between two relatively movable conductors, the improvement wherein:
   (a) the two conductors are disposed for relative rotation about a horizontal common axis, at least one of the conductors having an axle coaxial with said common axis for rotatably driving said one conductor, each conductor having an annular contact flange extending radially outwardly therefrom with respect to said common axis; and (b) an auxiliary rotor is arranged for rotating about an axis coaxial with said common axis, said rotor being rotatably supported by bearing means carried on said axle of said one conductor, and having an inner periphery including two annular grooves in which respective rings of liquid metal are held by centrifugal force during rotation of said rotor and are electrically interconnected by an electrically conductive unit in said rotor, each annular groove encircling and receiving therewithin a respective annular contact flange of said two conductors in contacting relationship with its ring of liquid metal, thereby providing a path for transfer of electrical current between said two conductors by way of their respective contact flanges and said electrically interconnected rings of liquid metal with which said flanges are in contacting relationship.

2. An apparatus as claimed in claim 1, wherein the outer periphery of said contact flanges is provided with regular bulgings in respect of a circular line, whereby only these bulgings are in contact with the ring of liquid metal.

3. An apparatus as claimed in claim 1, in an electrical machine in which the electrical current is transferred between a number of conductor pairs, wherein for each pair of conductors, there are two grooves and one electrically conductive unit arranged on the inner periphery of said auxiliary rotor, each electrical circuit of this type being insulated from the other circuits in the apparatus.

4. The apparatus as claimed in claim 3, wherein the surfaces that are in contact with said ring of liquid metal are parallel with the zero-flux plane of an external magnetic flux through the surfaces concerned.

5. An apparatus as claimed in claim 4, wherein those surfaces of the auxiliary rotor and of the contact flanges which are galvanically connected to each other are positioned in the same zero-flux plane.

6. An apparatus as claimed in claim 5, wherein the liquid metal is arranged so as to be carried to and from said auxiliary rotor via rotary connections, each pair of grooves is provided with two connections.

7. An apparatus as claimed in claim 5, wherein the liquid metal is arranged so as to be carried to and from said grooves of the auxiliary rotor via channels in the flanges of one group of electrical conductors and that the liquid metal is equally distributed between galvanically interconnected grooves via connecting channels in said auxiliary rotor.

8. An apparatus as claimed in claim 7, wherein the liquid metal is removed from said grooves of the auxiliary rotor by being emptied through controllable valves into a collecting vessel which rotates together with said auxiliary rotor.

* * * * *